(12) United States Patent
Eswaran et al.

(10) Patent No.: US 8,935,725 B1
(45) Date of Patent: Jan. 13, 2015

(54) VISUALLY BROWSING VIDEOS

(75) Inventors: Krishnan Eswaran, Oakland, CA (US); Vijnan M. Shastri, Mountain View, CA (US); Dmitry Broyde, San Jose, CA (US)

(73) Assignee: Google Inc., Mountain View, CA (US)

( * ) Notice: Subject to any disclaimer, the term of this patent is extended or adjusted under 35 U.S.C. 154(b) by 22 days.

(21) Appl. No.: 13/447,380

(22) Filed: Apr. 16, 2012

(51) Int. Cl.
   H04N 5/445   (2011.01)
   G06F 3/00    (2006.01)

(52) U.S. Cl.
   USPC ................... 725/44; 725/41; 725/53

(58) Field of Classification Search
   CPC .................................................. H04N 21/4621
   USPC ................................................. 725/44, 41, 53
   See application file for complete search history.

(56) References Cited

U.S. PATENT DOCUMENTS

| | | | |
|---|---|---|---|
| 5,900,868 A * | 5/1999 | Duhault et al. | 725/42 |
| 7,386,870 B2 * | 6/2008 | Lu | 725/62 |
| 7,966,632 B1 | 6/2011 | Pan et al. | |
| 8,258,685 B2 * | 9/2012 | Kindler et al. | 313/110 |
| 2003/0084445 A1 * | 5/2003 | Pilat | 725/44 |
| 2006/0064716 A1 * | 3/2006 | Sull et al. | 725/37 |
| 2007/0250901 A1 * | 10/2007 | McIntire et al. | 725/146 |
| 2008/0066103 A1 * | 3/2008 | Ellis et al. | 725/38 |
| 2008/0097970 A1 * | 4/2008 | Olstad et al. | 707/3 |
| 2010/0186041 A1 | 7/2010 | Chu et al. | |

* cited by examiner

Primary Examiner — Mark D Featherstone
Assistant Examiner — Michael M Nguyen
(74) Attorney, Agent, or Firm — Lowenstein Sandler LLP

(57) ABSTRACT

A method for enabling visual browsing of a plurality videos includes identifying a low frame rate version for each video from a plurality of videos using one or more computers, wherein the low frame rate version of each video from the plurality of videos is at a frame rate that provides a visually perceptible pause between successive visually distinct frames; and outputting information that defines a visual display, wherein the visual display presents a plurality of graphical representations each corresponding to a respective video from the plurality of videos, wherein each graphical representation from the plurality of graphical representations includes the low frame rate version of the respective video from the plurality of videos.

26 Claims, 11 Drawing Sheets

VISUALLY BROWSING VIDEOS

BACKGROUND

Video hosting websites typically maintain a repository of videos and provide a front end user interface that allows users to browse, search, and watch videos. Some video hosting websites produce original video content. Other video hosting websites license video content from third parties. Other video hosting websites allow users to upload videos and share those videos with the public at large or with one or more other users who are granted access to the videos.

User interfaces for browsing or searching videos often display results in the form of thumbnails corresponding to videos. The thumbnails typically represent a single frame of the video. As an example, a video may be encoded at a frame rate of 30 frames per second. In the context of a lengthy video, a single frame may or may not convey meaningful information to a user that is browsing or searching a large library of videos. Sometimes, text descriptions of videos are displayed to supplement single-frame thumbnails. In some instances, the text descriptions can be missing, incomplete, or inaccurate. As a result, it may be difficult for a user to quickly understand the nature of the content that is presented in a video or a group of videos.

The video repositories that are maintained by video hosting sites can become very large. For this reason, video search engines have been developed to allow users to search for videos. Some video search engines utilize data regarding the popularity of a video as one basis for ranking and sorting videos within search results. This can bias video search results in favor of older content.

SUMMARY

Disclosed herein are embodiments of systems and methods for visually browsing videos.

One aspect of the disclosed embodiments is a method for enabling visual browsing of a plurality videos that includes identifying a low frame rate version for each video from a plurality of videos using one or more computers, wherein the low frame rate version of each video from the plurality of videos is at a frame rate that provides a visually perceptible pause between successive visually distinct frames. The method also includes outputting information that defines a visual display. The visual display presents a plurality of graphical representations each corresponding to a respective video from the plurality of videos. Each graphical representation from the plurality of graphical representations includes the low frame rate version of the respective video from the plurality of videos.

Another aspect of the disclosed embodiments is an apparatus for enabling visual browsing of videos. The apparatus includes an input device that receives a request for a category of videos, a communications interface that transmits the request to a remote server and receives from the server information that defines a visual display, and a display that renders the visual display. The visual display presents a plurality of graphical representations each corresponding to a video associated with the category of videos. Each graphical representation includes a low frame rate version of the respective video, and wherein the low frame rate version of each video from the plurality of videos is at a frame rate that provides a visually perceptible pause between successive frames.

Another aspect of the disclosed embodiments is a non-transitory computer readable medium including program instructions executable by one or more processors that, when executed, cause the one or more processors to perform operations for enabling visual browsing of videos. The operations include identifying a low frame rate version for each video from a plurality of videos, wherein the low frame rate version of each video from the plurality of videos is at a frame rate that provides a visually perceptible pause between successive visually distinct frames, and outputting information that defines a visual display. The visual display presents a plurality of graphical representations each corresponding to a respective video from the plurality of videos. Each graphical representation from the plurality of graphical representations includes the low frame rate version of the respective video from the plurality of videos.

Another aspect of the disclosed embodiments is a method that includes receiving, at one or more computers, a plurality of video upload transmissions, and extracting, at the one or more computers, a first video frame corresponding to each video upload transmission from the plurality of video upload transmissions while each video upload transmission is active. The method can also include transmitting information to a remote client while each video upload transmission is active that, when rendered by the remote client, causes the remote client to define a visual display including the first video frame from each video upload transmission from the plurality of video upload transmissions.

Another aspect of the disclosed embodiments is a method that includes receiving, at one or more computers, a plurality of video upload transmissions, and extracting, at the one or more computers, at least one video frame corresponding to each video upload transmission from the plurality of video upload transmissions. The method also includes identifying, at the one or more computers, a group of related video upload transmissions from the plurality of video upload transmissions based on at least one shared characteristic of each video upload transmission from the group of related video upload transmissions while each video upload transmission from the group of related video upload transmissions is active. The method also includes transmitting information to a remote client that, when rendered by the remote client, causes the remote client to define a visual display including the at least one video frame from each of at least some of the video upload transmissions from the group of related video upload transmissions.

Another aspect of the disclosed embodiments is a method that includes receiving, at one or more computers, at least one video upload transmission, and extracting, at the one or more computers, a series of non-sequential video frames corresponding to the at least one video upload transmission. The method also includes defining a low frame rate representation corresponding to the at least one video upload transmission, the low frame rate representation incorporating the series of non-sequential video frames from the at least one video upload transmission, wherein the low frame rate representation of the at least one video upload transmission is at a frame rate that provides a visually perceptible pause between successive frames. The method also includes transmitting information to a remote client that, when rendered by the remote client, causes the remote client to define a visual display including the low frame rate representation, wherein the visual display is transmitted to the remote client during a time period in which the at least one video upload transmission is received at the one or more computers. The method can include storing a received video portion for each video upload transmission from the at least one video upload transmission, wherein extracting a series of non-sequential video frames corresponding to the at least one video upload transmission is performed by extracting the series of non-sequential video frames from the received video portion. The low frame rate representation of the at least one video upload transmission can be at a frame rate that is less than or equal to 1.0 frames per second. The low frame rate representation of the at least one video upload transmission can include a single image that is updated periodically.

Another aspect of the disclosed embodiments is a method that includes receiving, at one or more computers, a plurality of active video upload transmissions, and defining a low frame rate representation for each active video upload transmission from the plurality of active video upload transmissions. The method also includes transmitting information to a remote client that, when rendered by the remote client, causes the remote client to define a visual display including the low frame rate representation for each active video upload transmission from the plurality of active video upload transmissions. The method can also include storing a received video portion for each active video upload transmission, wherein the low frame representation of each active video upload transmission is rendered using the received portion of the respective active video upload transmission. The low frame rate representation of each active video upload transmission can be at a frame rate that provides a visually perceptible pause between successive frames. The low frame rate representation of each active video upload transmission can be at a frame rate that is less than or equal to 1.0 frames per second. The low frame rate representation of each active video upload transmission can include a single image, and defining the low frame rate representation can be repeated periodically. The visual display can include the low frame rate representation of each active video upload transmission arranged in a grid.

BRIEF DESCRIPTION OF THE DRAWINGS

The description herein makes reference to the accompanying drawings wherein like reference numerals refer to like parts throughout the several views, and wherein.

DETAILED DESCRIPTION

Today, a large number of videos are available for users to view, e.g., on the Internet. Enhancing a user's ability to visually browse many videos in a short amount of time can be beneficial. Additionally, a user's experience can be enhanced if the user is provided with an interface that allows the user to see what is being uploaded, e.g., to a content hosting site, in real time. One aspect of this disclosure leverages a human cognitive ability to quickly scan a display screen and perceive a matrix of videos simultaneously.

In one implementation, a user interface with a wall of dynamic video feeds is provided. In an exemplary implementation, the video feeds are rendered as low-frame rate versions as further described herein. In a user interface that presents thumbnail representations of videos, a thumbnail image shows a single frame of each video; this single thumbnail image may or may not convey meaningful information regarding the content of each video. If, instead, multiple full motion videos are displayed so as to provide more complete information regarding the content of the videos, the user could become overwhelmed by the amount of information presented. Systems and methods described herein can convey meaningful information regarding a plurality of simultaneously rendered videos without overwhelming the user by simultaneously rendering low frame rate versions of videos in a matrix or grid. The term matrix and grid are used interchangeably herein. In one implementation, the wall is part of a touch and swipe user interface, such as can be implemented in a mobile device, e.g., a smart phone or tablet.

Also, by ranking and sorting video search results primarily on the basis of popularity, some video hosting services bias search results against newly uploaded content. In addition, videos that are in the process of being uploaded to a video hosting service are typically not searchable until they are completely uploaded to the video hosting service and indexed by the video hosting service. In one implementation, systems and methods described herein can allow discovery of newly uploaded content by clustering videos into groups as they are uploaded. In another implementation, content that is currently being uploaded is made available for discovery by users by generating and displaying low frame rate versions of videos while they are being uploaded to a video hosting service. Systems and methods described herein also can also allow a user to simultaneously evaluate the content of multiple videos in real time by incorporating the low frame rate versions of the videos into a visual display, while they are being uploaded to a video hosting service.

Figure 1:
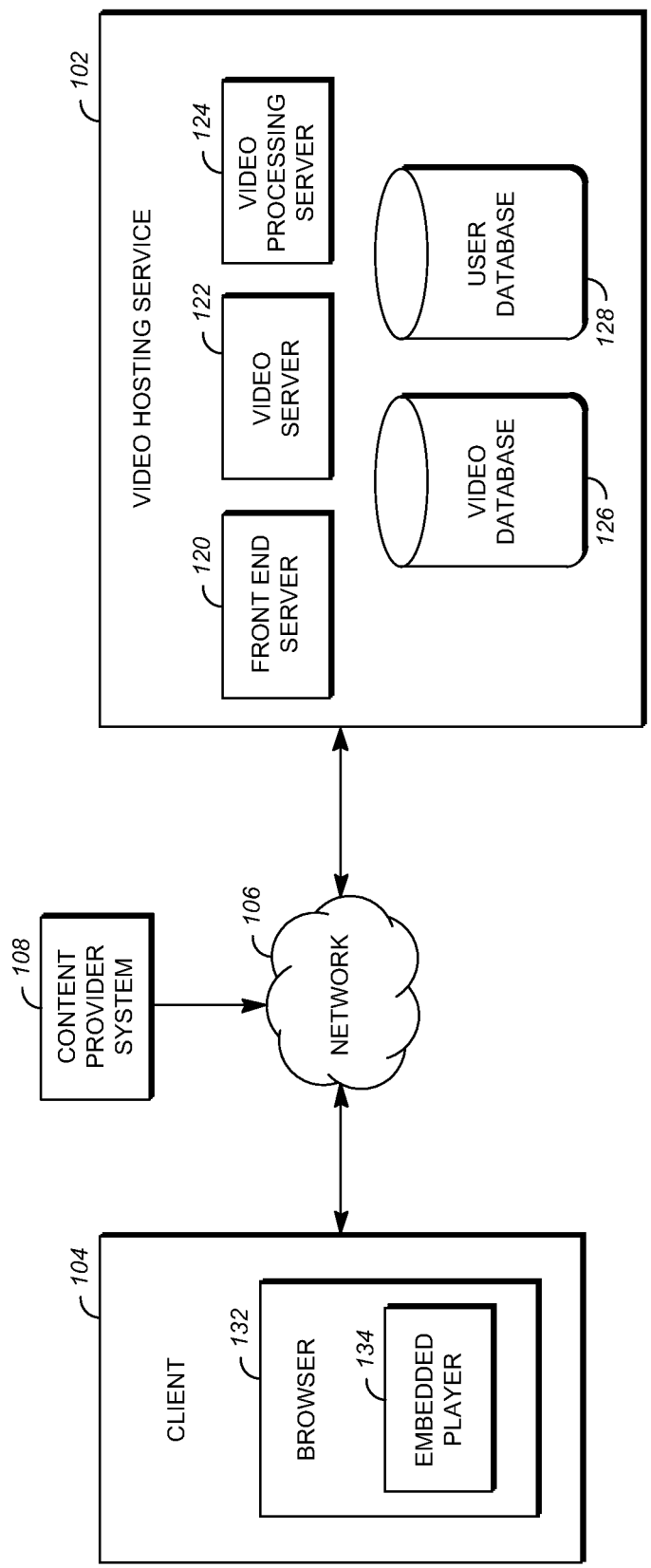
FIG. 1 is block diagram showing an example of system architecture for implementation of a system for enabling visual browsing of videos in accordance with aspects of this disclosure.

FIG. 1 is a block diagram of an example of a system architecture that can be utilized for implementation of a system for visually browsing videos in accordance with aspects of this disclosure. The system can include a video hosting service 102 that is connected to a client 104 by a network 106. One or more content provider systems 108 can also be connected to the network 106 for transmitting media content to the video hosting service 102.

The video hosting service 102 can include a front end server 120, a video server 122, a video processing server 124, a video database 126, and a user database 128. Other conventional features, such as firewalls, load balancers, application servers, failover servers, site management tools, and so forth can be included, but are not shown so as to more clearly illustrate the features of the system.

The front end server 120 is operable to send information to and receive information from the client 104 via the network 106. The information can include a webpage (e.g. in HTML and/or other code defining a webpage). The front end server 120 can be configured to define one or more web pages that provide a graphical user interface for visually browsing videos as described herein. The front end server 120 can also be configured to receive input, instructions, queries, or other signals from the client 104 via the network 106, and cause information to be transmitted to the client 104 in response.

The video server 122 receives uploaded media content from content providers, such as the content provider systems 108, and enables content to be viewed by the client 104. Content can be uploaded to the video server 122, e.g., via the Internet from a personal computer, through a cellular network from a telephone or tablet, or by other means for transferring data over the network 106 known to those of ordinary skill in the art. The uploaded content can include, for example, video, audio or a combination of video and audio. As used herein, video can refer to video content alone or video and audio content combined. The uploaded content is processed and stored in the video database 126. This processing can include format conversion (transcoding), compression, metadata tagging, and other data processing. Each uploaded video can be assigned a video identifier when it is processed. In some examples, an uploaded content file can be associated with an uploading user, and a user's account record can be updated in the user database 128 accordingly. For purposes of convenience, the uploaded content may referred to a "videos", "video files", or "video items", but no limitation on the types of content that can be uploaded are intended by this terminology unless otherwise explicitly expressed.

Content can also be downloaded from the video server 122. In one embodiment, media content is provided as a file download to the client 104. In an alternative embodiment, media content is streamed to the client 104. The means by which media content is received by video server 122 need not match the means by which it is delivered to client 104. For example, a content provider may upload a video via a browser on a personal computer, whereas the client 104 may view that video as a stream sent to a mobile device. Note also that the video server 122 may itself serve as the content provider.

The video database 126 can be used to store the received videos. In one implementation, the video database 126 stores video content and associated metadata, provided by their respective content owners. The video files can have metadata associated with each file such as a video ID, artist, video title, label, genre, and time length.

The user database 128 can maintain a record of users that upload videos to the video hosting service 102 and/or view videos using the video hosting service 102. The user database 128 may also identify, for a given user, videos that are associated with the user. Examples include a list of videos uploaded by the user, a list of the user's favorite videos, or one or more playlists that are established by the user. (The term "list", as used herein for concepts such as lists of authorized users, lists of videos, URL lists, and the like, refers broadly to a set of elements, where the elements may or may not be ordered.) In some embodiments, videos can be uploaded and/or viewed anonymously, in which case, the user database 128 can be omitted. In embodiments disclosed herein, the video hosting service 102 notifies users of the types of information that are transmitted to and stored by the video hosting service 102 and provides the user the opportunity to opt-out of having such information collected and/or shared with the video hosting service 102.

The various servers and databases can be conventionally implemented, whether as a single piece of software or hardware or as multiple pieces of software or hardware. In general, functions described in one example as being performed on the server side can also be performed on the client side in other examples if appropriate.

The client 104 can be implemented in the form of any of a variety of different computing devices. Examples of devices that can be utilized as the client 104 include personal computers, digital assistants, personal digital assistants, cellular phones, mobile phones, smart phones, laptop computers and tablet computers. Other devices can be utilized as the client 104.

The client 104 can execute an application such as a browser 132. Using the browser 132, the client can connect to the front end server 120, e.g., of the video hosting service 102 via the network 106.

The browser 132 can include an embedded video player 134. The embedded video player 134 can be a native functionality of the browser 132 itself, or can be a plug-in component that is utilized by the browser 132. Any player adapted for the video file formats used by the video hosting service 102 can be utilized. A user can access a video from the video hosting service 102 by browsing a catalog of videos, conducting searches on keywords, reviewing play lists from other users or the system administrator (e.g., collections of videos forming channels), or viewing videos associated with a particular user group (e.g., communities).

The user of the client 104 can also search for videos based on keywords, tags, geolocation or other metadata. One or more search requests can be generated by the client 104, and transmitted to the video hosting service 102. The search requests are received by the front end server 120. In response to the search requests, the front end server 120 executes one or more search queries at the video database 126, to identify videos that satisfy the search requests. The front end server 120 can support searching of any fielded data for a video, including its title, description, tags, author, category and so forth.

In one implementation, users can upload content to the video hosting service 102 using the browser 132 of the client 104 to transfer the content via the network 106.

Applications other than the browser 132 can be executed by the client 104 and can be utilized to perform the functions that are described herein with reference to the browser 132. While only a single client and browser are shown, it is understood that very large numbers (e.g., millions) of clients can be supported and can be in communication with the video hosting service 102 at any time via the network 106.

The network 106 can be any kind of wired and/or wireless computing network or communications means capable of transmitting data or signals, such as a wireless and/or wired computing network allowing communication via, for example, an 802.11 ("Wi-Fi") protocol, cellular data protocol (e.g., EDGE, CDMA, TDMA, GSM, LTE)), and the like. Suitable examples include the internet, which is a packet-switched network, a local area network (LAN), wide area network (WAN), virtual private network (VPN), or any other means of transferring data. A single network or multiple networks that are connected to one another can be used. It is specifically contemplated that multiple networks of varying types can be connected together and utilized to facilitate the communications contemplated by the systems and elements described in this disclosure. Communications via the network 106 may be encrypted or otherwise encoded.

Operation of a first example of the system for visually browsing videos will be explained with reference to FIG. 2.

Figure 2:
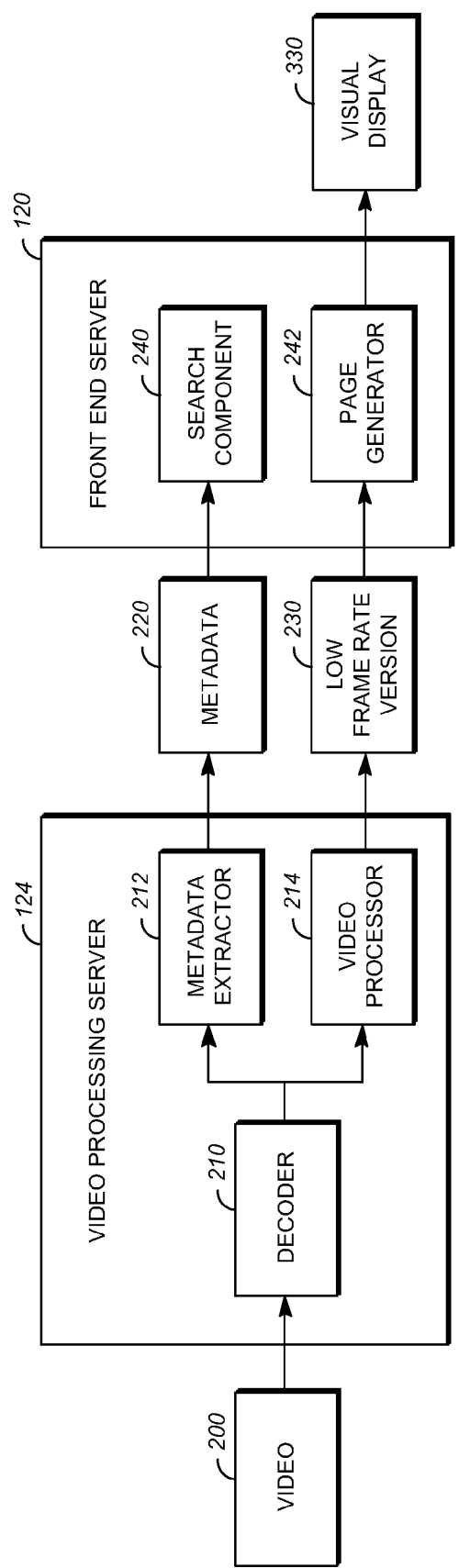
FIG. 2 is an illustration showing operation of a first example of a system for enabling visual browsing of videos in accordance with aspects of this disclosure.

FIG. 2 is an illustration showing operation of a system for enabling visual browsing of videos in accordance with aspects of this disclosure. In FIG. 2, the video processing server 124 can accept a video 200 as an input. The video 200 can be a previously stored video that is retrieved from the video database 126. Alternatively, the video 200 can be a file or stream that has been received by the video hosting service 102 and is being processed prior to storage in the video database 126.

The video processing server 124 can include a decoder 210, a metadata extractor 212, and a video processor 214. Each of the decoder 210, the metadata extractor 212, and the video processor 214 can be implemented, for example, in the form of computer executable instructions that can be executed by the video processing server 124. The computer executable instructions can be embodied in forms such as computer programs or functions stored on a computer readable medium.

The video 200 can be decoded by the decoder 210, and the output is delivered to the metadata extractor 212 and the video processor 214.

The metadata extractor 212 is operable to output one or more metadata elements 220 regarding the video 200. The metadata elements 220 can be stored by the metadata extractor 212, for example, in the video database 126. Some of the metadata elements 220 can be extracted from the video 200 without first decoding the video 200. This can be the case, for example, with regard to metadata elements that are stored in a metadata container that forms part of the video 200 or is associated with the video 200 when it is received by the video processing server 124. Some of the metadata elements 220 can be output by the metadata extractor 212 based on the video 200. For example, image analysis can be performed by the metadata extractor 212 on one or more frames that are extracted from the video 200 to identify features such as a predominant color, presence of a product or talking head, etc. Data representing these features can be stored as one or more of the metadata elements 220.

The video processor 214 accepts the video 200 as an input, subsequent to decoding of the video 200 at the decoder 210, and outputs a low frame rate version 230 of the video 200. The low frame rate version 230 includes a series of video frames from the video 200 that, when displayed, provide a visually perceptible pause between successive visually distinct frames. As one example, the low frame rate version 230 can have an effective frame rate that is less than or equal to 1.0 frames per second, e.g., one visually distinct frame every second or one visually distinct frame every two seconds. As another example, the low frame rate version 230 can be displayed such that successive frames of the low frame rate version 230 are displayed in response to a user input, such as a key press on an input device such as a keyboard, or a predetermined gesture on an input device such as a touch sensitive panel or a touch sensitive display screen.

The frames that are included in the low frame rate version 230 may be in any suitable visually perceptible form. As one example, the low frame rate version 230 can be encoded as a video file or a video feed. The video file or feed in which the low frame rate version 230 is encoded could be delivered to the client 104 as a live stream. As another example, the low frame rate version 230 can be provided in the form of an animated image. One suitable file format for an animated image is the GIF file format.

In another example, the low frame rate version 230 can be defined by encoding the low frame rate version 230 as a video at a standard frame rate, such as thirty frames per second, by defining multiple successive frames that display the same image. Thus, at an actual frame rate of thirty frames per second, an effective frame rate of 1.0 frame per second can be provided by the low frame rate version 230 by including thirty successive frames of a single image before transitioning to another image, which would also be displayed in thirty successive frames, for example. In this example, the user perceives a change in the visually perceptible image at one second intervals.

Successive frames or distinct images in the low frame rate version 230 can be generated based on even temporal intervals with respect to the video 200. As one example, one frame of the low frame rate version 230 could be generated for every second of the video 200, for every ten seconds of the video 200, for every minute of the video 200, or for any other selected interval of time. Alternatively, the temporal intervals between successive frames or distinct images in the low frame rate version 230 can be non-even intervals. As an example, the video processor 214 could analyze the frames of the video 200, and generate a new frame of the low frame rate version 230 when a degree of motion in the frame of the video 200 exceeds a predetermined threshold value.

The video processing server 124 can be configured such that the video processor 214 is executed to generate a low frame version 230 automatically while or after receiving the uploaded video. Accordingly, the video processor may output the low frame rate version 230 at a time relatively close to the time the video 200 is uploaded. The video processing server 124 can also be configured such that the video processor 214 is executed to generate the low frame version 230 later, such as after the video 200 is identified in response to a search request that is received from the client 104 or the video 200 is selected from among videos listed in a search result. Accordingly, the video processor 214 may output the low frame rate version 230 at a time distant from the time the video 200 is uploaded.

After the low frame rate version 230 is output by the video processor 214, the low frame rate version 230 can be stored in a storage device or other storage medium, such as the video database 126, or in memory at, for example, the video processing server 124 or the video server 122.

The front end server 120 is configured to output a visual display 330 that includes the low frame rate version 230 of the video 200. In some implementations, the visual display 330 incorporates a low frame rate version of each of a plurality of the videos 200, as will be explained further herein.

The front end server 120 can include a search component 240 and a page generator 242. The search component 240 is operable to identify the videos 200 that will be represented in the visual display 330. For example, the search component 240 can receive a search request from the client 104. In response to the search request, the search component 240 can identify one or more of the videos 200 using, for example, the metadata elements 220.

One example of a search request is a user input search query, such as entry of a text based string by the user, such as by typing on a keyboard or speaking into a microphone if the client 104 is provided with voice input functionality. Another example of a search request is a user selection of an attribute representing the content of a video, for example, metadata that is associated with the video, the time elapsed since the video was created or uploaded to the video hosting service 102, geolocation information, etc. Another example of a search request is a user entry of a keyword corresponding to an event or a user selection of an event (e.g. a concert, a sporting event, etc.). Multiple attributes, keywords, selections, and other criteria could be combined in a single search request. For example, a user may submit a search request for videos being uploaded to the content hosting site that relate to an event (e.g., a sporting event, concert, conference, etc.) occurring while the user is submitting the search request, e.g., a sporting event, concert, or conference occurring "now." As another example, a user may submit a search request for videos being uploaded to the content hosting site that relate to a breaking or recent news event, e.g., an earthquake that occurred the same hour or day as the search request is being submitted. As another example, a user may submit a search request for topical videos being uploaded to the content hosting site while the user is submitting the search request, e.g., cooking videos being uploaded "now" or surfing videos being uploaded "now." The request may be non-geolocation-specific or geolocation-specific. For example, a user may submit a search request for cooking videos that are in the process of being uploaded from New Orleans, if such geolocation source information is provided by uploading users, or for any videos being uploaded to the content hosting site from a particular geolocation source (e.g., La Vista, Nebr. where the user may be from or from a particular state, country, or region of interest).

The page generator 242 is configured to output the visual display 330. In some implementations, the page generator 242 is configured to output a web page that incorporates the visual display 330, and transmit the webpage to the client 104, for example. For each of the identified videos 200, the page generator 242 identifies the low frame rate version 230 corresponding to the respective video 200, and incorporates the low frame rate version 230 in the visual display, for example, by code that is included in the web page that incorporates the visual display 330 that, when rendered by the browser 132, causes the browser 132 to display the low frame rate version 230 of the video. The web page incorporating the visual display 330 is transmitted to the client 104 by the front end server 120.

Figure 3:
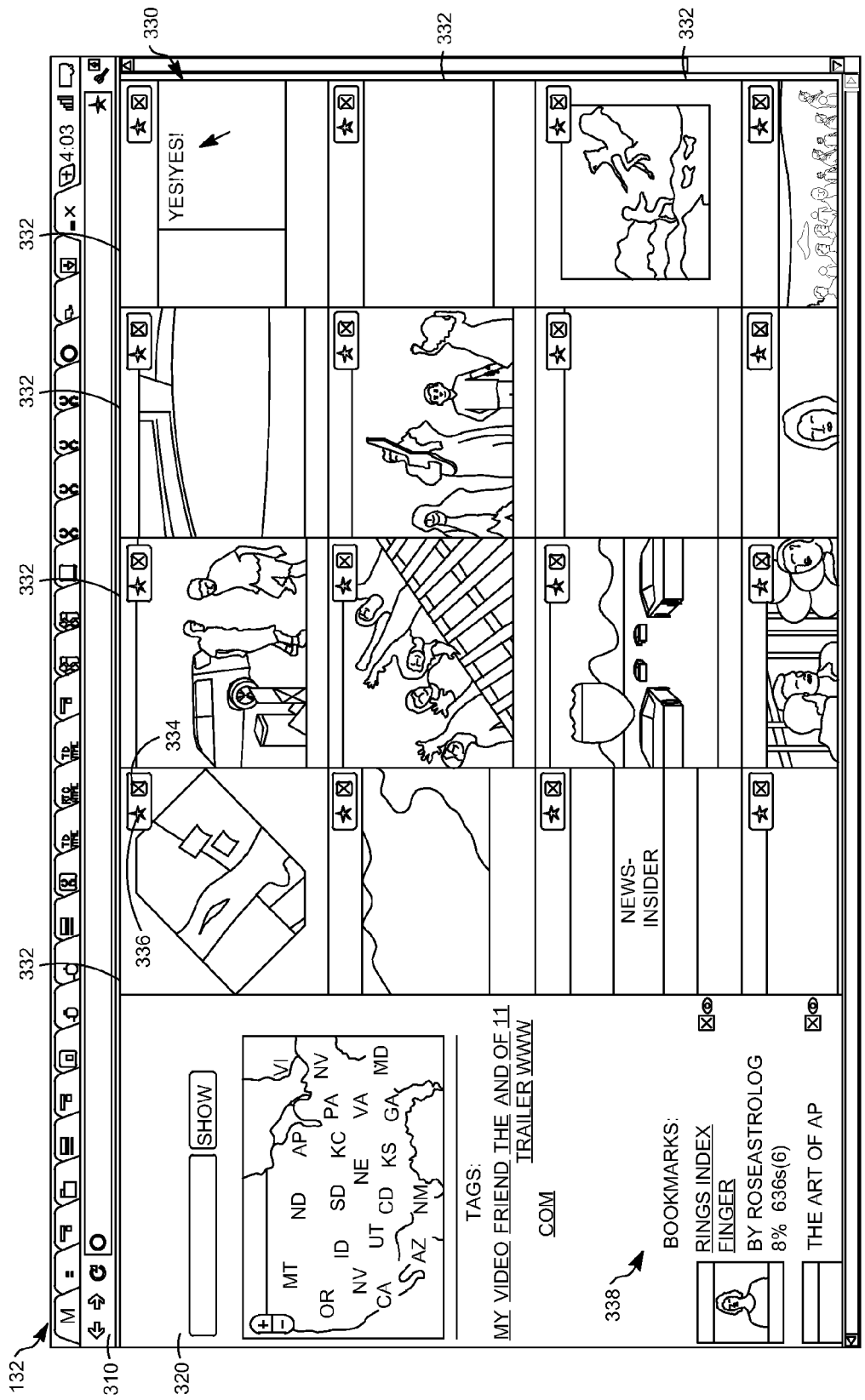
FIG. 3 is an illustration showing a visual display in a browser in accordance with aspects of this disclosure.

FIG. 3 is an illustration showing a visual display in a browser in accordance with aspects of this disclosure. As shown in FIG. 3, a web page that incorporates the visual display 330 is received by the client 104 and rendered by the web browser 132. The browser 132 can cause a user interface 310 and a content display area 320 to be rendered, such as to a display device that is associated with the client 104. The web page incorporating the visual display 330 can be displayed within the content display area 320 of the browser 132.

As rendered and displayed by the client 104, the visual display 330 incorporates a plurality of graphical representations 332. Each of the graphical representations 332 represents a respective video 200. The graphical representations 332 can each include or be the low frame rate version 230 for the respective video 200. By incorporating the low frame rate versions 230, the graphical representations 332, when displayed in the browser 132, each present a series of distinct images representing the respective video 200.

In one exemplary implementation, the graphical representations 332 are arranged in a grid, such as a substantially orthogonal grid. The graphical representations 332 can be closely spaced, such that no space is provided between adjacent pairs of the graphical representations 332, or such that a minimal spacing (e.g. five pixels) is provided between adjacent pairs of the graphical representations 332. The graphical representations can be playing simultaneously. For example, the client device can display a virtual wall that includes a grid of graphical representations that each gets refreshed at its low frame rate.

The web page in which the visual display 330 is incorporated can provide functions that are executable in response to user input regarding the videos 200 that are represented the graphical representations 332. As an example, JavaScript code can be used as a basis for implementation of the functions. Execution of the functions can be performed in response to user input such as a gesture input, selection of a user selectable interface element, or any other kind of user input.

As an example, in some implementations, the graphical representations 332 can include one or more user selectable interface elements. As one example, each of the graphical representations 332 can include a dismiss button 334. A selection (i.e. a mouse click or touch input) that selects the dismiss button 334 can cause the respective graphical representation 332 to be removed from the visual display. As another example, each of the graphical representations 332 can include a bookmark button 336. A selection (i.e. a mouse click or touch input) that selects the bookmark button 336 can cause the video 200 that is associated with the respective graphical representation 332 to be added to a user-defined list of videos, such as a bookmark list 338 or a list that is stored by the video hosting service 102, such as in the user database 128.

As another example, in some implementations, similar functions can be executed in response to gesture inputs. For example, a dismiss function can be executed in response to a swipe gesture that extends across one of the graphical representations 332, and can cause the respective graphical representation to be removed from the visual display 330. As another example, a bookmark function can be executed in response to a touch and hold gesture that is received at one of the graphical representations 332, and can cause the video 200 that is associated with the respective graphical representation 332 to be added to a user-defined list of videos, such as a bookmark list 338 or a list that is stored by the video hosting service 102, such as in the user database 128.

A bookmark button or other tool enabling a user to add a video to playlist can be particularly useful in implementations in which the graphical representations are associated with videos in the process of being uploaded and/or transcoded. As a low frame rate version of the full video, the graphical representation can provide users with information relating to full videos while those full videos are being more fully processed. In one implementation, selecting a graphical representation from the grid highlights the graphical representation, while a user interface allows the user to select additional graphical representation from the grid.

In one implementation, selecting a graphical representation pauses the playing of that particular low frame rate video, while unselected graphical representations on the grid continue to get refreshed with the next image(s) of the corresponding low frame rate video feed. In one implementation, unselected graphical representations on the grid are replaced with new graphical representations (e.g., new low frame rate videos) associated with other full videos, e.g., a latest uploaded full video about a news event. The replacement can occur at set time intervals or after a defined time period has lapsed without that particular graphical representation being selected. The user can select to view the playlist to actually view and navigate through the user-selected videos.

In one implementation, a user input selecting one of the videos 200 can cause playback of the full frame rate, full resolution version of the video 200. Playback of the video 300 can occur either in the context of the current web page or in the context of a new web page that is loaded in response to the user input.

The graphical representations 332 can be substantially rectangular in shape, and the graphical representations 332 can be presented at a size that is smaller than the videos 200. By way of example, the graphical representations 332 can be or include thumbnail-sized representations of the videos 200. In some examples, all of the graphical representations 332 have the same shape and size. The graphical representations 332 need not, however, all have the same shape and size, and various shapes and sizes can be selected for the graphical representations 332.

The video hosting service 102 or a portion thereof, such as the front end server 120, can output information, such as HTML code, that is operable to define the visual display 330, in response to a search request. The search request can include user-specified keywords, tags, attributes, geolocation information regarding the place where the video was recorded, etc. Alternatively, the search request can be a selection of a pre-defined category such as recent videos, sports videos, etc. The videos 200 that are identified based on the search request can be incorporated in the visual display 330, in the form of the graphical representations 332.

Figure 4:
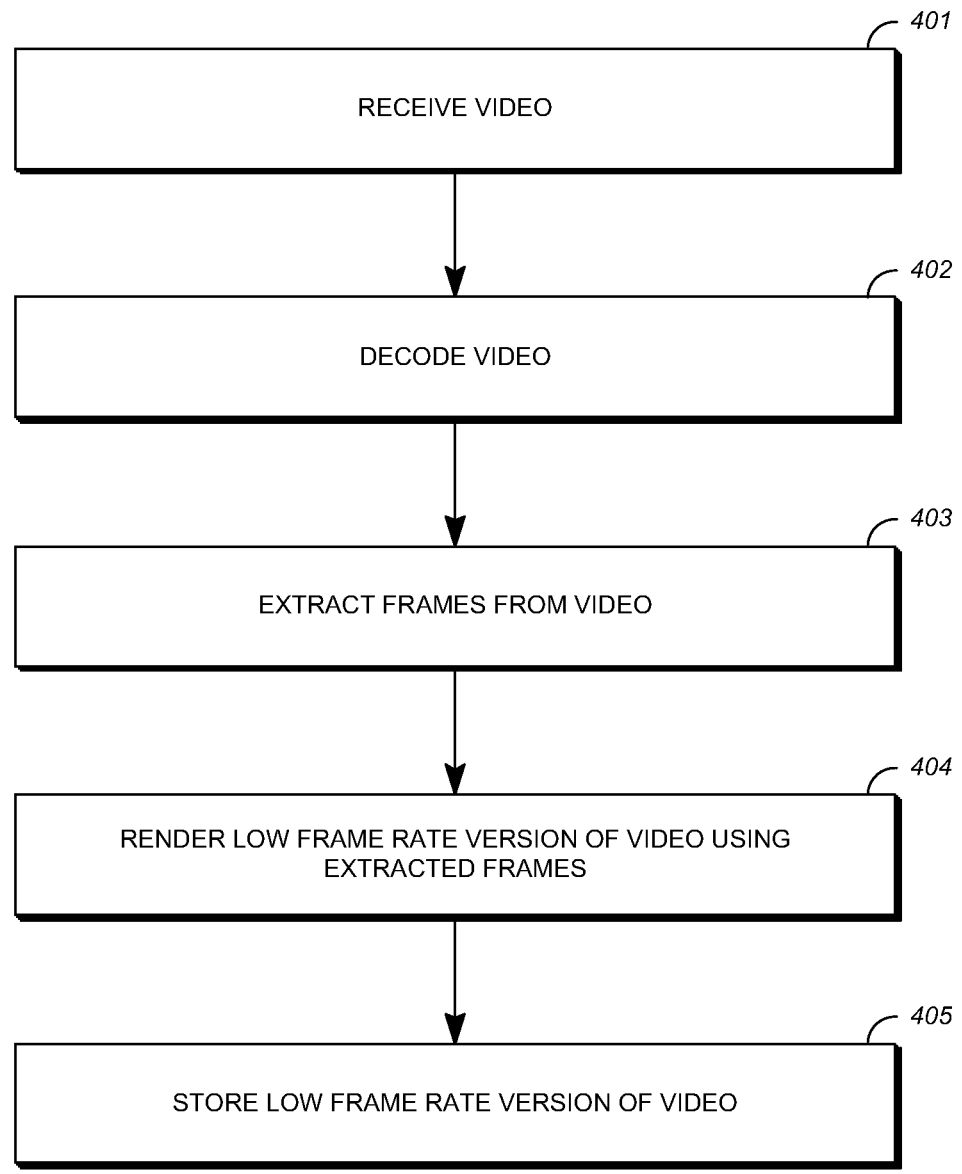
FIG. 4 is a flow chart showing an example of a process for rendering a low frame rate version of a video in the system of FIG. 2 in accordance with aspects of this disclosure.

An example of a process for rendering the low frame rate version 230 of the video 200 will now be explained with reference to FIG. 4. FIG. 4 is a flow chart showing an example of a process for rendering a low frame rate version of a video in accordance with aspects of this disclosure. This process can be implemented, for example, in the form of computer executable instructions that are stored in memory at the video processing server 124 and executed by a processor of the video processing server 124.

In operation 401, the video 200 is received at the video processing server 124. As previously noted, the video 200 can be a newly uploaded video that is being processed prior to storage at the video database 126, or can be retrieved from the video database 126. In operation 402, the video 200 is decoded by the decoder 210. In operation 403, frames from the video 200 are extracted by the video processor 214. In operation 404, the extracted frames are utilized to assemble the low frame rate version 230 of the video 200 in any suitable format, as discussed above. As noted above, the low frame rate version of the videos 200 can be rendered at a frame rate that provides a visually perceptible pause between successive frames. In one example, the low frame rate version 230 of each video 200 is rendered at a frame rate that is less than or equal to 1.0 frame per second. The low frame rate version 230 of each video 200 can be encoded in any suitable form, such as a video feed or an animated image (e.g. an animated GIF format image). In optional operation 405, the low frame rate version 230 can be stored, either in memory at one of the servers, such as the video processing server 124, or at the video database 126.

In some implementations, the process shown in FIG. 4 is performed for each of the videos 200 automatically in response to the video being uploaded to the video hosting service 102. In one such implementation, the low frame rate version 230 of each video 200 in the video database 126 is pre-rendered and stored, and not be generated when the visual display 330 is generated and transmitted by the front end server 120. This implementation allows the visual display 330 to be generated quickly in response to a request from the client 104. An example of a process for defining the visual display 330 when the low frame rate versions 230 of the videos 200 are pre-rendered will now be explained with reference to FIG. 5.

Figure 5:
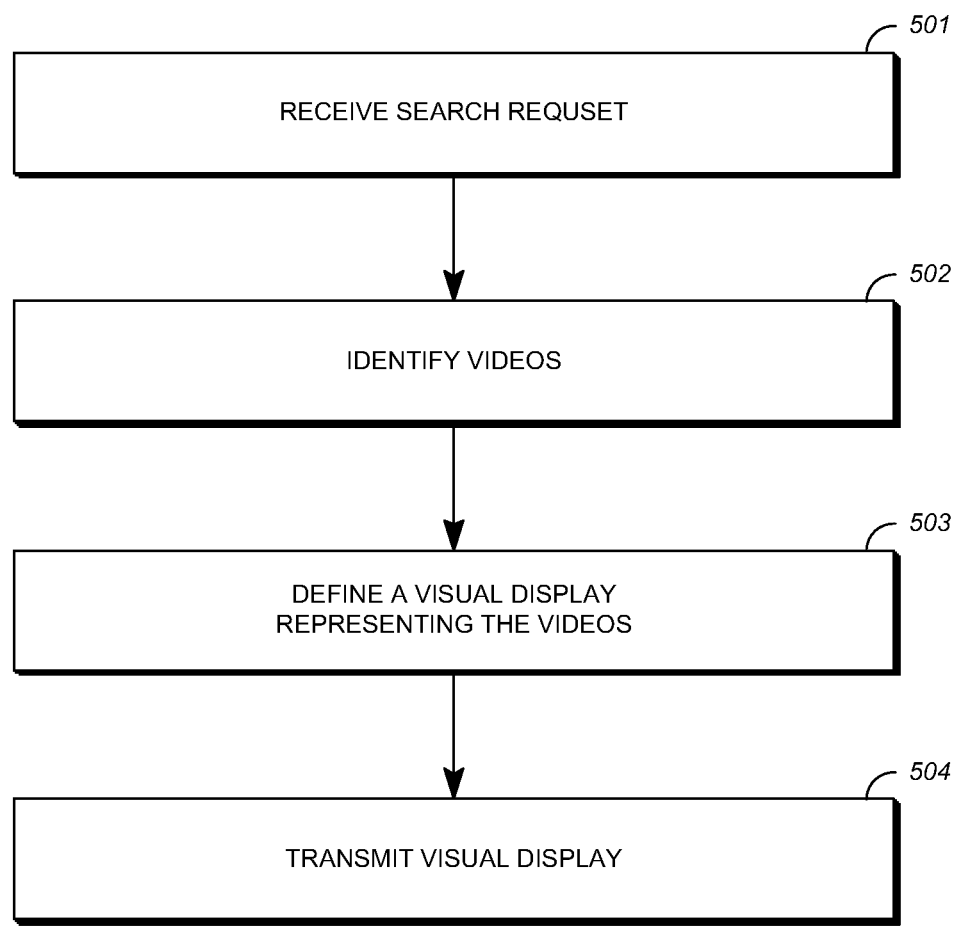
FIG. 5 is a flow chart showing a first example of a process for defining a visual display in the system of FIG. 2 in accordance with aspects of this disclosure.

FIG. 5 is a flow chart showing a first example of a process for defining a visual display in accordance with aspects of this disclosure. In operation 501, the video hosting service 102 receives a search request from the client 104. In operation 502, the video hosting service 102 identifies a set of the videos 200 based on the search request. This can be performed using search functions, as described above.

In operation 503, the front end server 120 outputs information that defines the visual display 330 when rendered by the client 104, including the graphical representations 332 corresponding to the videos 200 that were identified, or correspond to videos that were identified, in operation 502. Each graphical representation 332 includes the low frame rate version 230 of the respective video 200 that is represented by the graphical representation 332. In operation 504, the information defining the visual display 330 is transmitted from the front end server 120 of the video hosting service 102 to the client 104. As an example, the visual display 330 can be incorporated in a web page that is defined by the front end server 120.

After the visual display 330 is received by the client 104, such as in the form of a web page that can be rendered by the browser 132, the visual display 330 is rendered and output by the client 104. As an example, the visual display 330 can be output via a display device of the client 104. When displayed, the low frame rate versions 230 of the videos 200, as incorporated in the graphical representations 332, present a series of distinct images to the user of the client 104. As a result, the user of the client 104 is provided with meaningful information as to the content of the respective videos 200 that are represented by the graphical representations 332.

In some implementations, the process shown in FIG. 4 is performed for each video 200 in response to identification of the respective video 200 by the front end server 120 in response to a search request. This allows the low frame rate versions 230 to be stored in memory, such as at the video server 122 or the video processing server 124, or to be temporarily stored at the video database 126, and long term storage of the low frame rate versions 230 at the video database 126 can be optional. An example of a process for defining the visual display 330 when the low frame rate versions 230 of the videos 200 are generated in response to a search request will now be explained with reference to FIG. 6.

Figure 6:
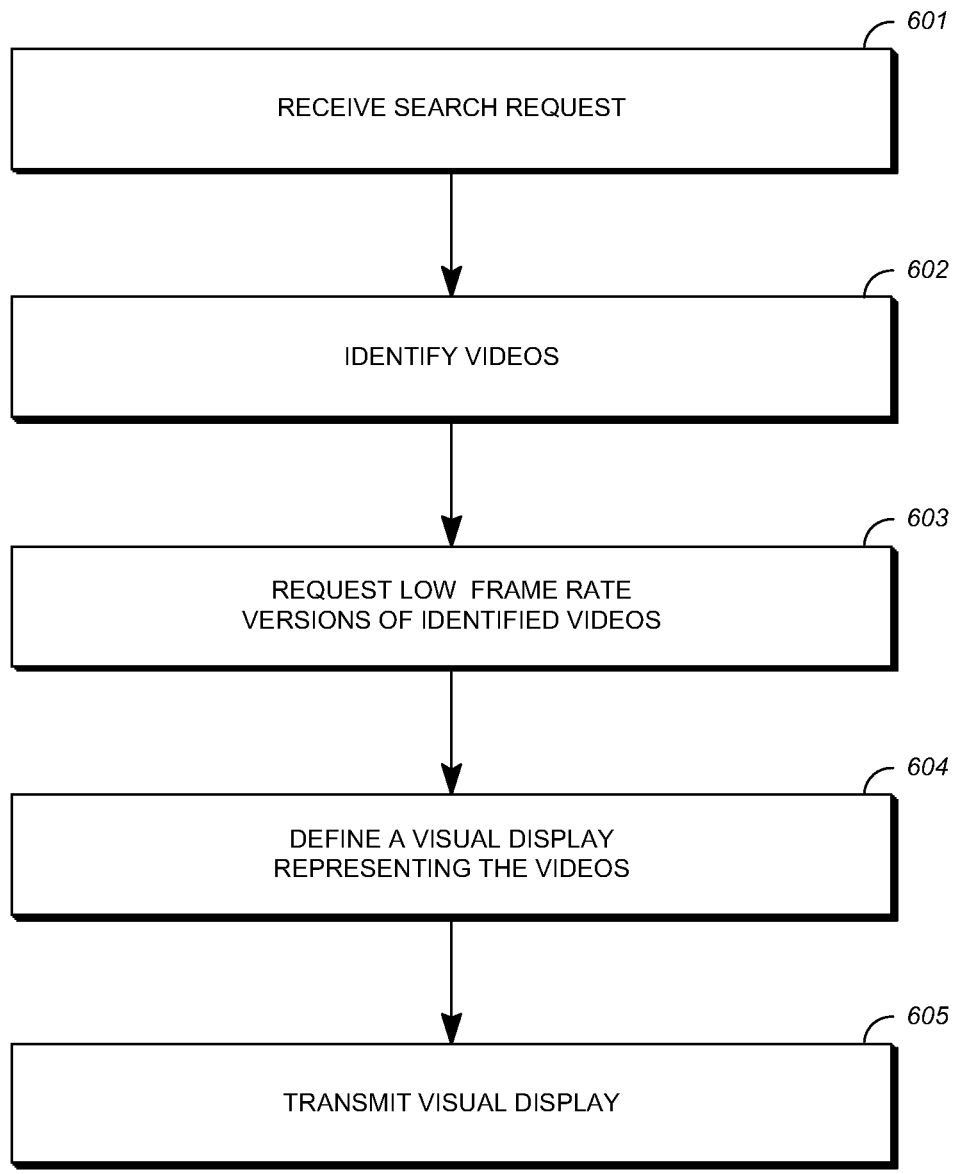
FIG. 6 is a flow chart showing a second example of a process for defining a visual display in the system of FIG. 2 in accordance with aspects of this disclosure.

FIG. 6 is a flow chart showing a second example of a process for defining a visual display in accordance with aspects of this disclosure. Operations 601 and 602 are analogous to operations 501 and 502, respectively, and proceed as described above. After the videos 200 are identified in response to the search request in operation 602, the process proceeds to operation 603. In operation 603 the front end server 120 requests generation of the low frame rate versions 230 corresponding to the videos 200 identified in response to the search request. For example, the front end server 120 can transmit such a request to the video processing server 124, and the low frame rate version 230 for each video 200 can be generated in the manner described in connection with FIG. 4. After operation 603, the process proceeds to operation 604. Operations 604 and 605 are analogous to operations 503 and 504, respectively, and proceed as described previously.

Figure 7:
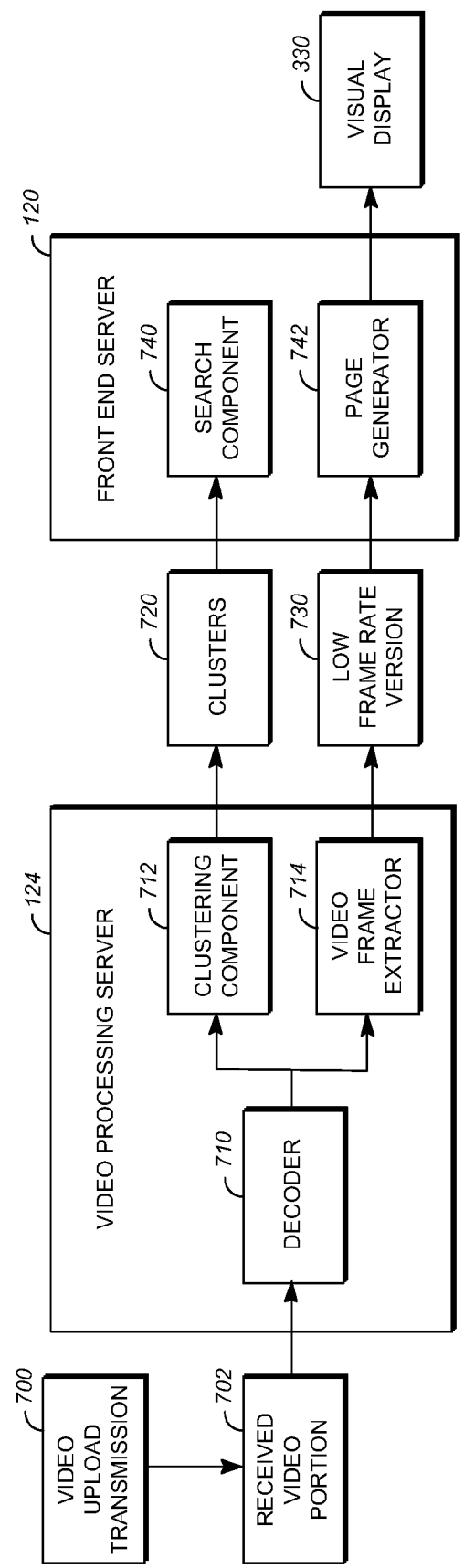
FIG. 7 is an illustration showing operation of a video processor of a second example of a system for enabling visual browsing of videos in accordance with aspects of this disclosure.

FIG. 7 is an illustration showing operation of a video processor of a second example of a system for enabling visual browsing of videos in accordance with aspects of this disclosure. In FIG. 7, one or more video upload transmissions 700 are transmitted, for example, by the content provider systems 108. Some of the video upload transmissions 700 can be data transmissions of media content items that were previously stored at respective ones of the content provider systems 108. These video upload transmissions 700 can be received, for example, in the form of a file upload. Some of the video upload transmissions 700 can be data transmissions of media content items that are currently being generated at respective ones of the content provider systems 108. These video upload transmissions 700 can be received in the form of media streams.

During transmission of the video upload transmissions 700 (i.e. while each of the video upload transmissions 700 are active), the video content from the video upload transmissions 700 can be stored as received video portions 702. Each of the received video portions 702 can correspond to a respective one of the video upload transmissions. Any suitable format can be utilized for storage of the received video portions 702. As one example, the received video portions 702 can be stored in memory at the video processing server 124. Memory caching techniques can be utilized for this purpose. As another example, the received video portions 702 can be stored at the video database 126.

The video processing server 124 can include a decoder 710, a clustering component 712, and a video frame extractor 714. Each of the decoder 710, the clustering component 712, and the video frame extractor 714 can be implemented, for example, in the form of computer executable instructions that can be executed by the video processing server 124. The computer executable instructions can be embodied in forms such as computer programs or functions stored on a computer readable medium.

The received video portion 702 can be accepted by the decoder 710 as an input. The output of the decoder 710 is a decoded version of the received video portion 702, which is delivered to the clustering component 712 and the video frame extractor 714. The decoder 710 can decode the received video portion 702 while the video upload transmission 700 is active, i.e. before the entire video is received and the video upload transmission 700 is terminated.

The clustering component 712 is operable to identify groups of the video upload transmissions 700 that are related. Two or more of the video upload transmissions 700 can be determined to be related in cases where the video upload transmissions 700 share at least one common characteristic. The clustering component 712 is operable to output one or more clusters 720 that identify or incorporate related ones of the video upload transmissions 700. Operation of the clustering component 712 can occur for each of the video upload transmissions 700 while they are active.

One example of a characteristic that can be utilized for grouping the video upload transmissions 700 is geolocation. The clustering component 712 can receive geolocation data, for example, from metadata elements that are associated with the video upload transmissions 700, or based on information that identifies the source or location from which each of the video upload transmissions 700 originates, such as an IP address of a respective one of the content provider systems 108 from which a respective one of the video upload transmissions 700 is being uploaded.

Another example of a characteristic that can be utilized for grouping the video upload transmissions 700 is the content of the received video portion 702. For example, image analysis can be performed by the clustering component 712 on one or more frames that are extracted from the received video portion 702 to identify features such as a predominant color, presence of a product or talking head, similar patterns or objects, etc.

In some implementations, the clustering component 712 identifies groups of the video upload transmissions 700 that are related based on two or more characteristics of each of the video upload transmissions. The clusters 720 are generated accordingly. As an example, the clustering component can define one of the clusters 720 to identify one or more of the video upload transmissions 700 based on geolocation and content. For example, an event of occurrence at a particular place could generate a large number of video uploads for similar subject matter, making that place a geographic "hotspot" for that subject matter at a particular moment in time. Thus, where a plurality of the video upload transmissions 700 originate from a common geographic area (e.g. within a predetermined distance with respect to each other), and include similar or related content, it can be inferred that these video upload transmissions 700 represent a single event or occurrence (e.g., a sporting event, natural disaster, political event, etc.), and one of the clusters 720 is defined on this basis.

The video frame extractor 714 is operable to extract one or more video frames corresponding to each of the video upload transmissions 700 while the video upload transmissions 700 are active. The video frame extractor 714 can accept the received video portions 702 for the video upload transmissions 700 as inputs, and extract one or more video frames from each of the received video portions 702. In some implementations, the video frame extractor 714 can output a series of non-sequential video frames from each of the received video portions 702 of the video upload transmissions 700. Extraction of video frames can occur periodically for respective ones of the video upload transmissions 700 while they remain active. Intervals between successive extracted frames can be variable or fixed. As one example, a variable interval between successive extracted frames can be dictated by the rate at which a respective one of the video upload transmissions 700 is received, or can be dictated by server loads, or any other factor. As another example, a fixed interval between successive frames or distinct images can be defined based on even temporal intervals with respect to the received video portions 702 of the video upload transmissions 700. In such an implementation, for example, a new frame could be extracted from a respective one of the received video portions 702 in response to receiving and decoding an additional ten seconds of new video.

The video frame extractor 714 can, using the extracted frames, generate low frame rate versions 730 corresponding to the video upload transmissions 700, while the video upload transmissions 700 are active. Each of the low frame rate versions 730 includes a series of non-sequential video frames from a respective one the video upload transmissions 700. The term "video frame" as used herein, includes versions of the extracted video frames that have been modified, for example, by generating thumbnail sized versions of the extracted video frames.

The low frame rate versions 730 can be encoded or caused to be displayed such that, when the low frame rate versions 730 are displayed, each provides a visually perceptible pause between successive visually distinct frames. As one example, the low frame rate version 730 can have an effective frame rate that is less than or equal to 1.0 frame per second, e.g., one visually distinct frame every second or one visually distinct frame every two seconds. As another example, the low frame rate version 730 can be displayed such that successive frames of the low frame rate version 730 are displayed in response to a user input, such as a key press on an input device such as a keyboard, or a predetermined gesture on an input device such as a touch sensitive panel or a touch sensitive display screen. In one implementation, the predetermined gesture can transmit a request from the client 104 to the video hosting service 102 that causes the video hosting service 102 to transmit an updated frame from the low frame rate version 730 to the client 104.

The frames that are included in the low frame rate versions 730 may be in any suitable visually perceptible form. As one example, the low frame rate versions 730 can be encoded as video files or video feeds. The video files or feeds in which the low frame rate versions 730 are encoded could be delivered to the client 104 as live streams. As another example, the low frame rate versions 730 can be provided in the form of animated images. One suitable file format for an animated image is the GIF file format.

In another example, each of the low frame rate versions 730 can be defined by encoding the low frame rate versions 730 videos at a standard frame rate, such as thirty frames per second, by defining multiple successive frames that display the same image. Thus, at an actual frame rate of thirty frames per second, an effective frame rate of 1.0 frame per second can be provided by the low frame rate versions 730 by including thirty successive frames corresponding to a single extracted frame before transitioning to another series of thirty successive frames that correspond to a different single extracted frame, for example. In this example, the user perceives a change in the visually perceptible image at one second intervals.

In another example, the low frame rate version 730 can include a single image that is updated periodically, for example, at one second intervals. When the low frame rate version 730 is updated, it can be pushed to the client 104, streamed to the client 104, or provided to the client 104 in response to a refresh request that is initiated by the client 104. Thus, by including a single image that is refreshed periodically as the low frame rate version 730, the client 104 can be presented with a representation of the respective video upload transmission 700 that has an effective frame rate of, for example, 1.0 frame per second.

After the low frame rate version 730 is output by the video frame extractor 714, the low frame rate version 730 can be stored in a storage device or other storage medium, such as in memory at the video processing server 124, or at the video database 126.

The front end server 120 is configured to output the visual display 330 such that it includes the low frame rate versions 730 corresponding to the video upload transmissions 700. In some implementations, the visual display 330 incorporates the low frame rate version 730 of each of a plurality of the video upload transmissions 700 in the graphical representations 332, in the manner explained above with reference to FIG. 3.

The front end server 120 can include a search component 740 and a page generator 742. The search component 740 is operable to identify the video upload transmissions 700 that will be represented in the visual display 330. For example, the search component 740 can receive a search request from the client 104. In response to the search request, the search component 740 can identify one or more of the video upload transmissions 700 using, for example, the clusters 720 by identifying one of the clusters 720 as being responsive to the search request, and identifying the video upload transmissions 700 that are associated with the clusters 720.

One example of a search request is a user input search query, such as entry of a text based string by the user, such as by typing on a keyboard or speaking into a microphone if the client 104 includes or is provided with voice input functionality. Another example of a search request is a user selection of an attribute representing the content of a video, for example, metadata that is associated with the video, the time elapsed since the video was created or uploaded to the video hosting service 102, geolocation information, etc. Another example of a search request is a user selection of one of the clusters 720. Another example of a search request is a user entry of a keyword corresponding to an event or a user selection of an event (e.g. a concert, a sporting event, etc.). The event can be represented by or associated with one or more of the clusters 720, such that the video upload transmissions 700 that are included in the clusters 720 representing the event can include content that relates to the event. Multiple attributes, keywords, selections, and other criteria could be combined in a single search request.

The page generator 742 is configured to output the visual display 330. In some implementations, the page generator 742 is configured to output a web page that incorporates the visual display 330, and transmit the webpage to the client 104, for example. For each or a subset of the video upload transmissions 700 that are identified in response to the search request, the page generator 742 identifies the corresponding one of the low frame rate versions 730, and incorporates it in the visual display, for example, by code that is included in the web page that incorporates the visual display 330 that, when rendered by the browser 132, causes the browser 132 to display the corresponding low frame rate versions 730. The web page incorporating the visual display 330 is transmitted to the client 104 by the front end server 120.

In one example, the client 104 generates a search request for the video upload transmissions 700 that are currently active. In response to this search request, the video server 122 identifies one or more of the video upload transmissions 700 that have not yet been completed. Each of the identified video upload transmissions 700 is currently being received by the video hosting service 102, and the information encoded therein is being stored as the one of the received video portions 702 as it is received. The video upload transmissions 700 that are identified by the video server 122 in response to the search request can be sorted, and a predetermined number of the received video portions 702 can be selected for representation in the visual display 330. For example, the video upload transmissions 700 can be sorted by the time elapsed since each respective video upload transmission 700 commenced. The video server 122 then outputs information for defining the visual display 330, and transmits the information to the client 104, including the graphical representations 332 that incorporate the low frame rate versions 730 corresponding to the video upload transmissions 700 that were identified in response to the search request.

Figure 8:
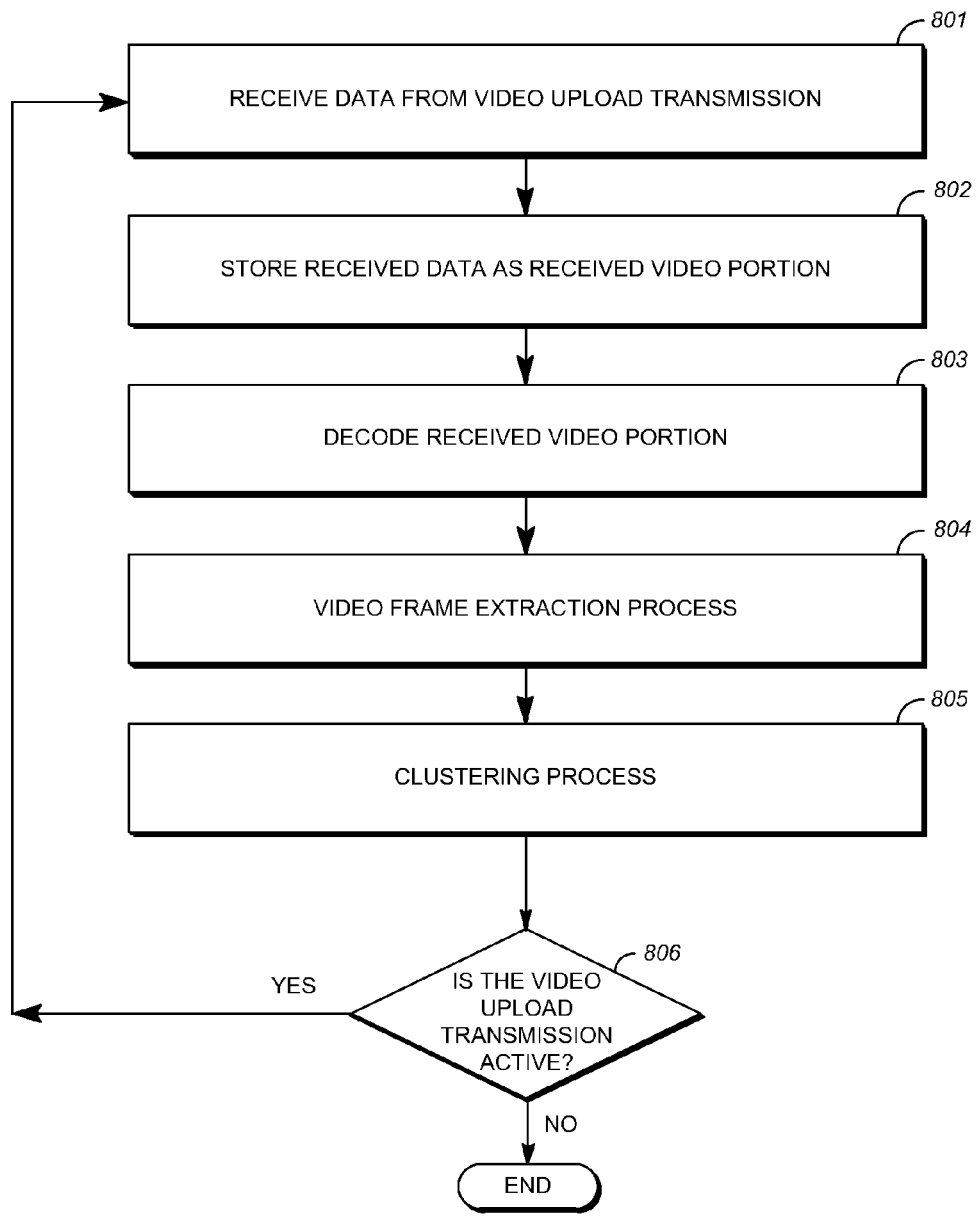
FIG. 8 is a flow chart showing an example of a process for enabling visual browsing of videos in the system of FIG. 7 in accordance with aspects of this disclosure.

FIG. 8 is a flow chart showing an example of a process for enabling visual browsing of videos in the system of FIG. 7 in accordance with aspects of this disclosure. This process can be performed for some or all of the video upload transmissions 700 while they remain active, during the time period starting when the respective video upload transmission 700 commences, until it is completed or otherwise terminated. This process can be implemented, for example, in the form of computer executable instructions that are stored in memory at the video processing server 124 and executed by a processor of the video processing server 124.

In operation 801, the video hosting service 102 receives data from one of the video upload transmissions 700. The received data can be stored as one of the received video portions 702 in operation 802.

In operation 803, the received video portion 702 is decoded. This operation can be performed, for example, by the decoder 710 of the video processing server 124.

In operation 804, the video frame extractor 714 is executed, using, for example, the decoded version of the received video portion 702 as an input. Execution of the video frame extractor 714 will be explained further herein. In operation 805, the clustering component 712 is executed, using, for example, the decoded version of the received video portion 702 as an input. Other information can be provided to the clustering component 712 as inputs, such as metadata that is associated with the video upload transmissions 700. Execution of the clustering component 712 will be explained further herein.

The operations described with respect to FIG. 8 can be executed in parallel with respect to each other. Presentation of these operations in a sequential manner is made for ease of explanation and is not necessarily meant to limit the operations to sequential execution. As an example, operations 801 through 803 can each be performed continuously. Operations 804 and 805 can be executed independent of one another, and need not occur in any particular order. Operations 804 and 805 can, in some implementations, be executed asynchronously with respect to the remainder of the operations shown in FIG. 8, and with respect to each other, and can be performed continuously.

In operation 806, a determination is made as to whether the video upload transmission 700 being processed is still active. If the video upload transmission is no longer active, the process ends. If the additional data is still be received at the video hosting service 102 from the video upload transmission 700, the process returns to operation 801, where the new data is received and processed.

Figure 9:
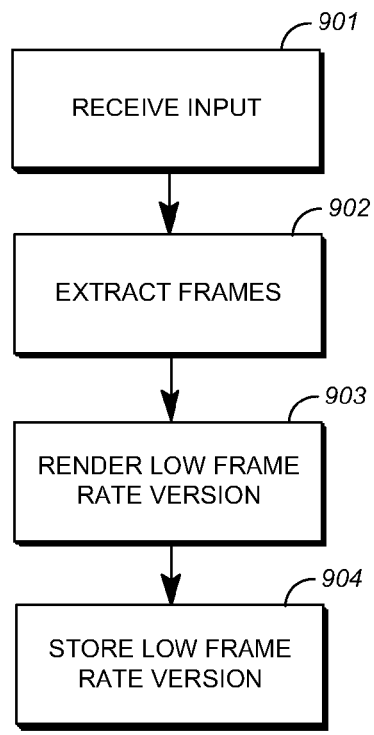
FIG. 9 is a flow chart showing an example of a process for video frame extraction in accordance with aspects of this disclosure.

FIG. 9 is a flow chart showing an example of a process for video frame extraction in accordance with aspects of this disclosure.

The video frame extraction process of FIG. 9 can be performed, for example, by the video frame extractor 714, which can be in the form of computer executable instructions that are stored in memory at the video processing server 124 and executed by a processor of the video processing server 124. This process can be executed, for example at operation 804 of the process of FIG. 8.

In operation 901, an input is received, e.g., by the video frame extractor 714. The input can correspond to one of the video upload transmissions 700. The input can be, for example, the decoded version of the received video portion 702 of one of the video upload transmissions 700. In operation 902, one or more frames corresponding to one of the video upload transmissions 700 are extracted by video frame extractor 714. In operation 903, the extracted frames are utilized to assemble the low frame rate version 730 corresponding to the video upload transmission 700 in any suitable format, as discussed above. In cases where the low frame rate version 730 for the respective video upload transmission 700 has been previously generated, the newly extracted frames can be added to the low frame rate version 730. As noted above, the low frame rate version 730 can be generated at a frame rate that provides a visually perceptible pause between successive frames. In one example, the low frame rate version 730 of each video upload transmission 700 is generated at a frame rate that is less than or equal to 1.0 frame per second. The low frame rate version 730 of each video upload transmission 700 can be encoded in any suitable form, such as a video feed or an animated image (e.g. an animated GIF format image). In operation 904, the low frame rate version 730 can be stored, either in memory at one of the servers, such as the video processing server 124, or at the video database 126.

Figure 10:
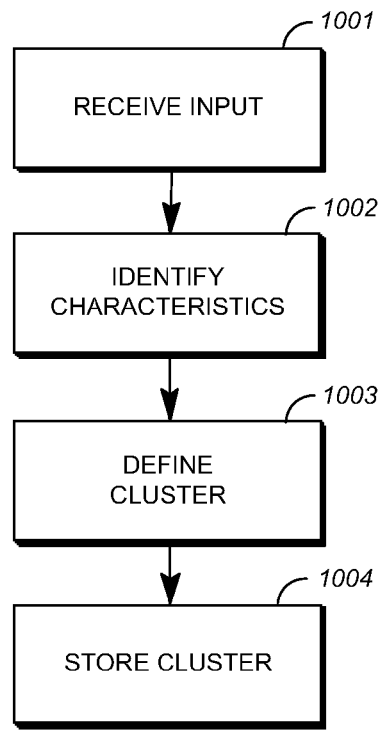
FIG. 10 is a flow chart showing an example of a process for clustering in the system of FIG. 7 in accordance with aspects of this disclosure.

FIG. 10 is a flow chart showing an example of a process for clustering in the system of FIG. 7 in accordance with aspects of this disclosure.

The clustering process of FIG. 10 can be performed, for example, by the clustering component 712, which can be in the form of computer executable instructions that are stored in memory at the video processing server 124 and executed by a processor of the video processing server 124. This process can be executed, for example at operation 805 of the process of FIG. 8.

In operation 1001, an input is received, e.g., at the clustering component 712. The input can correspond to one of the video upload transmissions 700. The input can include, for example, the decoded version of the received video portion 702 of one of the video upload transmissions 700. The input can also include metadata that is associated with the one of the video upload transmissions 700. In operation 1002, one or more characteristics of the video upload transmission 700 are identified, based on, for example, metadata that is associated with the video upload transmission 700 being processed, or image analysis that is performed using the received video portion 702 as an input, as described above.

In operation 1003, the clusters 720 are defined by establishing one or more new clusters 720 including the video upload transmission 700 being processed, or by adding the video upload transmission 700 being processed to a preexisting one of the clusters 720. In this operation, the characteristics identified in operation 1002 are compared to characteristics that have been identified for other ones of the video upload transmissions 700. As one example, the clustering component 712 can identify two or more of the video upload transmissions 700 that share a predetermined number of characteristics. As another example, the clustering component 712 can determine that the video upload transmission 700 being processed includes characteristics that match those of an existing one of the clusters 720, in which case, the video upload transmission 700 can be added to the existing cluster 720. The video upload transmission 700 being processed can be associated with multiple clusters 720 in operation 1003.

In optional operation 1004, the newly defined or modified clusters 720 are stored. As one example, the clusters 720 can be stored in memory at the video processing server 124. As another example, the clusters 720 can be stored at the video database 126.

Figure 11:
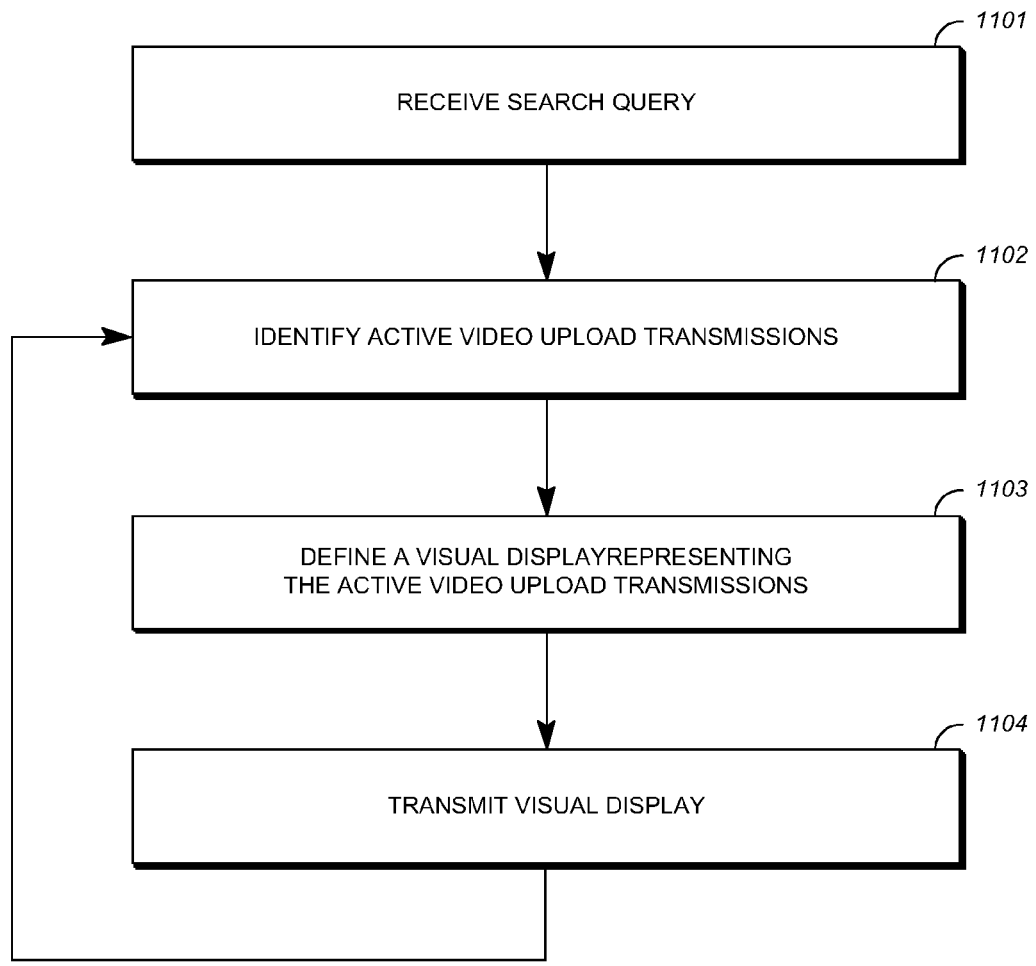
FIG. 11 is a flow chart showing an example of a process for defining a visual display in the system of FIG. 7 in accordance with aspects of this disclosure.

FIG. 11 is a flow chart showing an example of a process for defining a visual display in the system of FIG. 7 in accordance with aspects of this disclosure.

In operation 1101, the video hosting service 102 receives a search request from the client 104. In operation 1102, the video hosting service 102 identifies a group of the video upload transmissions 700 based on the search request. This can be performed using search functions, as described above.

In operation 1103, the front end server 120 outputs information that defines the visual display 330 when rendered by the client 104, including the graphical representations 332 corresponding to the video upload transmissions 700 that were identified in operation 1102. Each graphical representation 332 includes the low frame rate version 730 of the respective video upload transmission 700 that is represented by the graphical representation 332. In operation 1104, the information defining the visual display 330 is transmitted from the front end server 120 of the video hosting service 102 to the client 104. As an example, the visual display 330 can be incorporated in a web page that is defined by the front end server 120. After operation 1104, the process can, in some implementations, return to operation 1102 in order to update the contents of the visual display 330. This can occur periodically, continuously, in response to a user input, or based on any other criteria.

After the visual display 330 is received by the client 104, such as in the form of a web page that can be rendered by the browser 132, the visual display 330 is rendered and output by the client 104. As an example, the visual display 330 can be output via a display device of the client 104. In some implementations, when displayed, the low frame rate versions 730 corresponding to the video upload transmissions 700, as incorporated in the graphical representations 332, present a series of distinct images to the user of the client 104. As a result, the user of the client 104 is provided with meaningful information as to the content of the video upload transmissions 700 that are represented by the graphical representations 332. Because the visual display 330 incorporates graphical representations 332 that correspond to the video upload transmissions 700 that are being received at the video hosting service, the user of the client 104 is provided with information regarding recent videos. Also, by using the clusters 720, similar ones of the video upload transmissions 700 can be grouped and presented to the user of the client 104 as groups of related videos. This can allow, for example, presentation of groups of videos that relate to events that are ongoing or recently concluded.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer may include software in the form of programmable code, micro code, and or firmware or other hardware embedded logic. A computer may include multiple processors which operate in parallel. The processing performed by a computer may be distributed among multiple separate devices, and the term computer encompasses all such devices when configured to perform in accordance with the disclosed embodiments.

Figure 12:
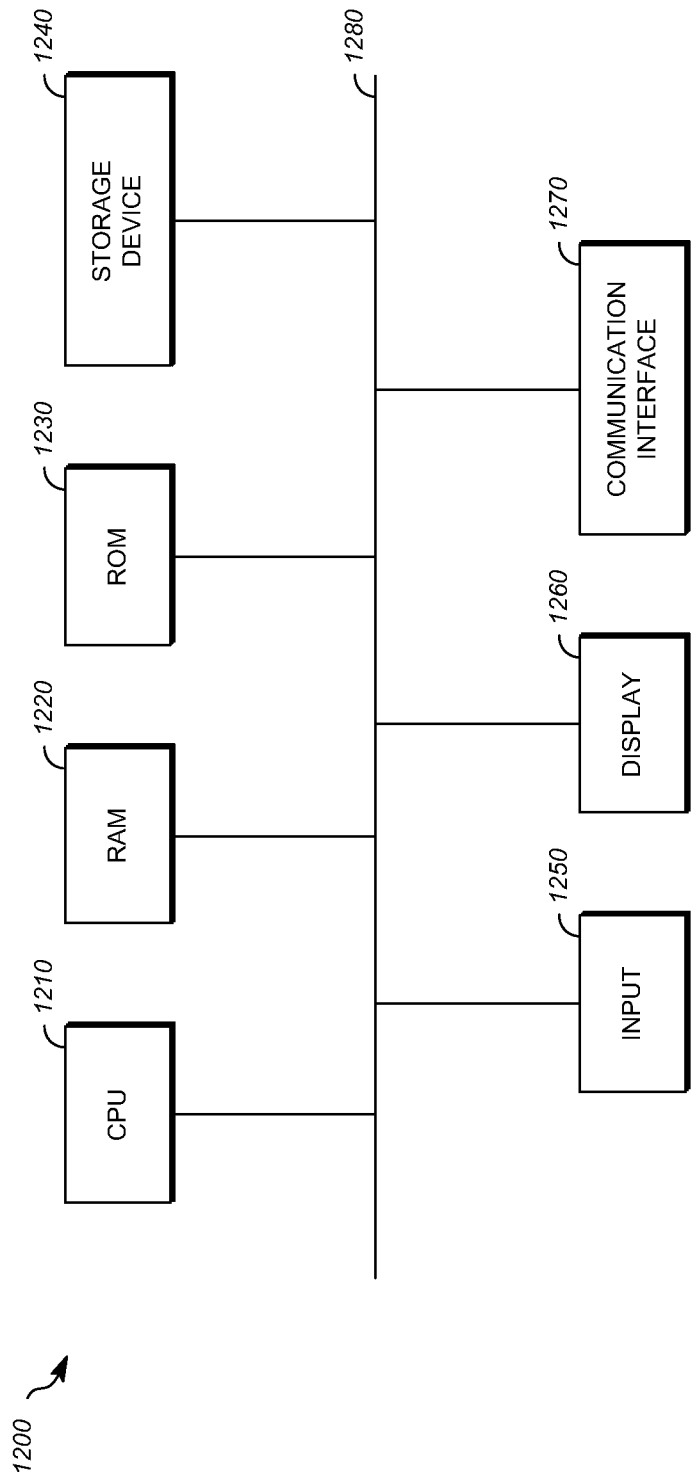
FIG. 12 is a block diagram showing an example of a computer system applicable to implementations of this disclosure.

An example of a device that can be used as a basis for implementing the systems and functionality described herein, including the video hosting service 102 and the client 104, is a computer system 1200, as shown in FIG. 12. FIG. 12 is a block diagram showing an example of a computer system applicable to implementations of this disclosure. The computer system 1200 can be any suitable computing device. As an example, the computer system 1200 can include a processor such as a central processing unit (CPU) 1210 and memory such as RAM 1220 and ROM 1230. A storage device 1240 can be provided in the form of any suitable computer readable medium, such as a hard disk drive. One or more input devices 1250, such as a keyboard and mouse, a touch screen interface, etc., allow user input to be provided to the CPU 1210. A display 1260, such as a liquid crystal display (LCD) or a cathode-ray tube (CRT), allows output to be presented to the user. The input devices 1250 and the display 1260 can be incorporated in a touch sensitive display screen. A communications interface 1270 is any manner of wired or wireless means of communication that is operable to send and receive data or other signals using the network 106. The CPU 1210, the RAM 1220, the ROM 1230, the storage device 1240, the input devices 1250, the display 1260 and the communications interface 1270 are all connected to one another by a bus 1280.

Each of the video hosting service 102, the client 104, the front end server 120, the video server 122, the video processing server 124, and all other computer-based systems described herein can be implemented in the form of a multiple computers, processors, or other systems working in concert. As an example, the functions of the video processing server 124 can be distributed among a plurality of conventional computers, such as the computer system 1200, each of which are capable of performing some or all of the functions of the video processing server 124.

All or a portion of the systems described herein can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, a magnetic device, an optical device, an electromagnetic device, or a semiconductor device. Other suitable mediums are also available. As an example, the functions described in connection with the video processing server 124 and the front end server 120, including any or all of the operations discussed in connection with FIGS. 4-6 and 8-11, can take the form of a computer program product that is stored in and accessible from the memory of the video processing server 124 and/or the front end server 120.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

While this disclosure includes what is presently considered to be the most practical and preferred embodiment, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method performed by one or more computers, comprising:
    identifying a low frame rate version for each video from a plurality of videos, wherein the low frame rate version of each video from the plurality of videos is at a frame rate that provides a visually perceptible pause between successive visually distinct frames; and
    outputting information that defines a visual display, wherein the visual display presents a plurality of graphical representations each corresponding to a respective video from the plurality of videos, wherein each graphical representation from the plurality of graphical representations includes the low frame rate version of the respective video from the plurality of videos,
    wherein each graphical representation from the plurality of graphical representations is removable from the visual display based on a received user input, wherein upon removal of a graphical representation from the visual display a new graphical representation corresponding to a respective video from the plurality of videos that was not previously included in the visual display replaces the removed graphical representation at the removed graphical representation's location within the visual display, wherein both the video associated with the removed graphical representation and the video associated with the new graphical representation are available for viewing by the user before and after the replacement, wherein the new graphical representation includes the low frame rate version of a respective video from the plurality of videos, and wherein each graphical representation from the plurality of graphical representations for which a selection has not been received from the user input within a defined time period is removed and replaced with a new graphical representation in response to a passage of the defined time period.

2. The method of claim 1, wherein the low frame rate version of each video from the plurality of videos is at a frame rate that is less than or equal to 1.0 frames per second.

3. The method of claim 1, wherein the low frame rate version of each video from the plurality of videos is encoded as a video feed.

4. The method of claim 1, wherein the low frame rate version of each video from the plurality of videos is encoded as an animated image.

5. The method of claim 1, wherein each graphical representation from the plurality of graphical representations includes a user-selectable interface element that is operable to add the respective video from the plurality of videos to a user-defined list of videos, wherein the user-defined list of videos is separate from the plurality of graphical representations.

6. The method of claim 1, further comprising: receiving a search request from a remote client for a category of videos; and identifying the plurality of videos based on the search request.

7. The method of claim 6, wherein the category is associated with a difference between a current time and a video upload time, wherein the current time is indicated by a time-keeping device.

8. The method of claim 6, wherein the category is associated with a geolocation source of the videos.

9. The method of claim 6, wherein generating the low frame rate version of each video from the plurality of videos is performed in response to identifying the plurality of videos based on the search request.

10. An apparatus, comprising:
    an input device that receives a request for a category of videos;
    a communications interface that transmits the request to a remote server and receives from the server information that defines a visual display; and
    a display that renders the visual display, wherein the visual display presents a plurality of graphical representations each corresponding to a video associated with the category of videos, wherein each graphical representation includes a low frame rate version of the respective video, wherein the low frame rate version of each video from the plurality of videos is at a frame rate that provides a visually perceptible pause between successive frames, wherein each graphical representation from the plurality of graphical representations is removable from the visual display based on a received user input, wherein upon removal of a graphical representation from the visual display a new graphical representation corresponding to a respective video from the plurality of videos that was not previously included in the visual display replaces the removed graphical representation at the removed graphical representation's location within the visual display, wherein both the video associated with the removed graphical representation and the video associated with the new graphical representation are available for viewing by the user before and after the replacement, and wherein the new graphical representation includes the low frame rate version of a respective video from the plurality of videos, and wherein each graphical representation from the plurality of graphical representations for which a selection has not been received from the user input within a defined time period is removed and replaced with a new graphical representation in response to a passage of the defined time period.

11. The apparatus of claim 10, wherein the low frame rate version of each video from the plurality of videos is at a frame rate that is less than or equal to 1.0 frame per second.

12. The apparatus of claim 10, wherein the low frame rate version of each video from the plurality of videos is encoded as an animated image.

13. The apparatus of claim 10, wherein the visual display presents the plurality of graphical representations arranged in a grid.

14. The apparatus of claim 10, wherein the category is associated with a difference between a current time and a video upload time, wherein the current time is indicated by a time-keeping device.

15. The apparatus of claim 10, wherein the category is associated with a geolocation source of the videos.

16. The method of claim 1 wherein each graphical representation from the plurality of graphical representations is removable upon selection of a user-selectable interface element.

17. The method of claim 1, wherein each graphical representation from the plurality of graphical representations includes a user-selectable interface element that is operable to select the respective graphical representation, wherein selected graphical representations from the plurality of graphical representations are prevented from being removed, while graphical representations from the plurality of graphical representations that are not selected continue to be removable.

18. The method of claim 17, wherein graphical representations from the plurality of graphical representations that are not selected are removed in response to the passage of a time interval.

19. The method of claim 17, wherein graphical representations from the plurality of graphical representations that are not selected are removed in response to the passage of a time interval relative to the respective graphical representation's lack of being selected.

20. The method of claim 1, wherein a first graphical representation from the plurality of graphical representations and a second graphical representation from the plurality of graphical representations differ in shape.

21. The method of claim 1, wherein a first graphical representation from the plurality of graphical representations and a second graphical representation from the plurality of graphical representations differ in size.

22. The method of claim 1, wherein each graphical representation from the plurality of graphical representations includes a user-selectable interface element that is operable to change at least one of the shape or the size of the respective graphical representation.

23. The method of claim 1, wherein adjacent graphical representations from the plurality of graphical representations are not more than 5 pixels apart.

24. The method of claim 1, wherein adjacent graphical representations from the plurality of graphical representations are 0 pixels apart.

25. The method of claim 1, wherein at least two successive frames of the low frame rate video of a selected graphical representation of the plurality of graphical representations are displayed responsive to respective second and third received user inputs.

26. The method of claim 25, wherein at least one of the second and third received user inputs is a pre-determined gesture.

* * * * *